United States Patent
Wakimoto

(10) Patent No.: US 11,479,385 B2
(45) Date of Patent: Oct. 25, 2022

(54) PACKAGING FASTENER AND PACKAGING BOX COUPLED BY USING THE SAME

(71) Applicant: KYOCERA Document Solutions Inc., Osaka (JP)

(72) Inventor: Atsuhiro Wakimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 171 days.

(21) Appl. No.: 17/146,277

(22) Filed: Jan. 11, 2021

(65) Prior Publication Data
US 2021/0221559 A1  Jul. 22, 2021

(30) Foreign Application Priority Data
Jan. 17, 2020 (JP) .............................. JP2020-005642

(51) Int. Cl.
| | |
|---|---|
| *B65D 19/02* | (2006.01) |
| *B65D 19/38* | (2006.01) |
| *B65D 19/06* | (2006.01) |
| *B65D 8/00* | (2006.01) |
| *B65D 81/05* | (2006.01) |

(52) U.S. Cl.
CPC ............. *B65D 19/38* (2013.01); *B65D 15/22* (2013.01); *B65D 19/06* (2013.01); *B65D 81/057* (2013.01); *B65D 2519/00661* (2013.01)

(58) Field of Classification Search
CPC ........ B65D 19/38; B65D 15/22; B65D 19/06; B65D 81/057; B65D 2519/00661
USPC ............ 206/386, 600; 24/458; 108/34, 55.1; 292/80
See application file for complete search history.

(56) References Cited

U.S. PATENT DOCUMENTS

| | | | | |
|---|---|---|---|---|
| 5,862,917 A | * | 1/1999 | Noble .................... | B65D 19/18 206/600 |
| 7,552,826 B2 | * | 6/2009 | Watanabe ............. | B65D 19/02 24/457 |
| 7,896,159 B2 | * | 3/2011 | Goda ................... | B65D 81/056 206/386 |
| 7,908,719 B2 | * | 3/2011 | Liverman ............. | F16B 5/0642 24/453 |

(Continued)

FOREIGN PATENT DOCUMENTS

| | | |
|---|---|---|
| JP | S63-67246 A | 3/1988 |
| JP | 2015-042560 A | 3/2015 |

*Primary Examiner* — Luan K Bui
(74) *Attorney, Agent, or Firm* — Studebaker & Brackett PC

(57) ABSTRACT

A packaging fastener includes a base member and a key member. The base member includes a first cylindrical part inserted through overlapped through holes of packaging materials. The key member includes a second cylindrical part inserted into the first cylindrical part of the base member. By inserting the first cylindrical part of the base member through the through holes and then inserting the second cylindrical part into the first cylindrical part, the packaging materials are coupled together. The key member has an engaging part. The base member has an engaged part. The engagement part has an elastically deformable supporting part and a lock claw. In a state where the lock claw is engaged with the engaged part, by elastically deforming the supporting part, the lock claw is displaced to a direction separate away from the engaged part to release an engagement of the lock claw with the engaged part.

11 Claims, 12 Drawing Sheets

(56) References Cited

U.S. PATENT DOCUMENTS

| | | | | |
|---|---|---|---|---|
| 7,922,219 B2* | 4/2011 | Franzone, Jr. | ...... | F16B 19/1081 |
| | | | | 292/341.15 |
| 8,118,188 B2* | 2/2012 | Xin | ...... | B65D 5/4283 |
| | | | | 220/326 |
| 8,256,615 B2* | 9/2012 | Goda | ...... | B65D 19/06 |
| | | | | 206/386 |
| 8,608,003 B2* | 12/2013 | Uno | ...... | B65D 19/18 |
| | | | | 410/70 |
| 9,327,869 B2* | 5/2016 | Nakamura | ...... | B65D 19/20 |

* cited by examiner

US 11,479,385 B2

PACKAGING FASTENER AND PACKAGING BOX COUPLED BY USING THE SAME

INCORPORATION BY REFERENCE

This application is based on and claims the benefit of priority from Japanese patent application No. 2020-005642 filed on Jan. 17, 2020, which is incorporated by reference in its entirety.

BACKGROUND

The present disclosure relates to a packaging fastener which is inserted through overlapped holes of two or more divided packaging materials, such as a corrugated cardboard sheet, to couple the packaging materials together.

Conventionally, a so-called C-type packaging box, in which a product is placed on a lower box, covered with an upper box and then the lower and upper boxes are coupled together, is widely used for packaging a large and heavy product such as an electronics apparatus.

When such a C-type packaging box is unpacked, a way for easily removing a fastener to couple the lower box and the upper box together has been discussed. For example, a packaging fastener is provided with a base member (a base body) and a key member (a key body). The base member has a cylindrical part, a flange part formed in one end of the cylindrical part, and a pair of hook members connected to opposite inner walls of the cylindrical part via hinge portions. The key member has a pushing open part insertable into the cylindrical part of the base member.

In the above packaging fastener, when the key member is pushed into the cylindrical part of the base member, the hook members are turned, the two packaging materials are held between the hook members and the flange part of the base member and coupled together. The coupling of the packaging materials is released by inserting a finger into an upper opening of the key member, hooking the finger, which is guided by an inclined plate, on the end portion of the key member, and then pulling it upward.

Alternatively, in another packaging fastener, the hook member has an engagement projection on the contact face coming into contact with the pushing open part, and the pushing open part has a slit, engageable with the engagement projection, on the contact face coming into contact with the hook member. In the packaging fastener, by engaging the engagement projection with the slit in a state where the pushing open part is inserted into the cylindrical part completely, it becomes possible to keep the engagement of the key member with the base member.

In the above described packaging fastener, in order to prevent the engagement of the key member with the base member from being released owing to impact during transportation, it is required to firmly engage the engagement projection with the slit. This requires a large force to release the engagement of the key member with the base member, and a workability for opening the packaging box may be deteriorated.

Additionally, because it is difficult for the user to intuitively recognize the removal way of the packaging fastener, an explanatory drawing may be sometimes required, or it may take time to understand the operation way.

SUMMARY

In accordance with an aspect of the present disclosure, a packaging fastener includes a base member and a key member. The base member includes: a first cylindrical part inserted through overlapped through holes of packaging materials; a flange part formed around a first opening edge opened on one end side of the first cylindrical part; and a pair of hook members connected to an inner wall face of the first cylindrical part so as to face each other and bent outside a second opening edge opened on the other end side of the first cylindrical part. The key member includes a second cylindrical part inserted into the first cylindrical part of the base member. The packaging fastener couples the packaging materials, by inserting the first cylindrical part of the base member into the through holes from a side of the second opening edge and then inserting the second cylindrical part into the first cylindrical part, so that the hook members are bent to be protruded outside through the second opening edge to nip the packaging materials with the flange part. The key member has an engaging part formed on a third opening edge opened on one end side of the second cylindrical part to lock the key member to the base member in a state where the second cylindrical part is inserted into the first cylindrical part. The base member has an engaged part formed on the inner wall of the first cylindrical part. The engaging part has: a supporting part that is elastically deformable and has a U-shape in a side view, connected to the third opening edge and extending toward a fourth opening edge opened on the other end side of the second cylindrical part; and a lock claw formed near a tip end portion of the supporting part and engaged with the engaged part. In a state where the lock claw is engaged with the engaged part, by elastically deforming the supporting part, the lock claw is displaced to a direction separate away from the engaged part to release an engagement of the lock claw with the engaged part.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
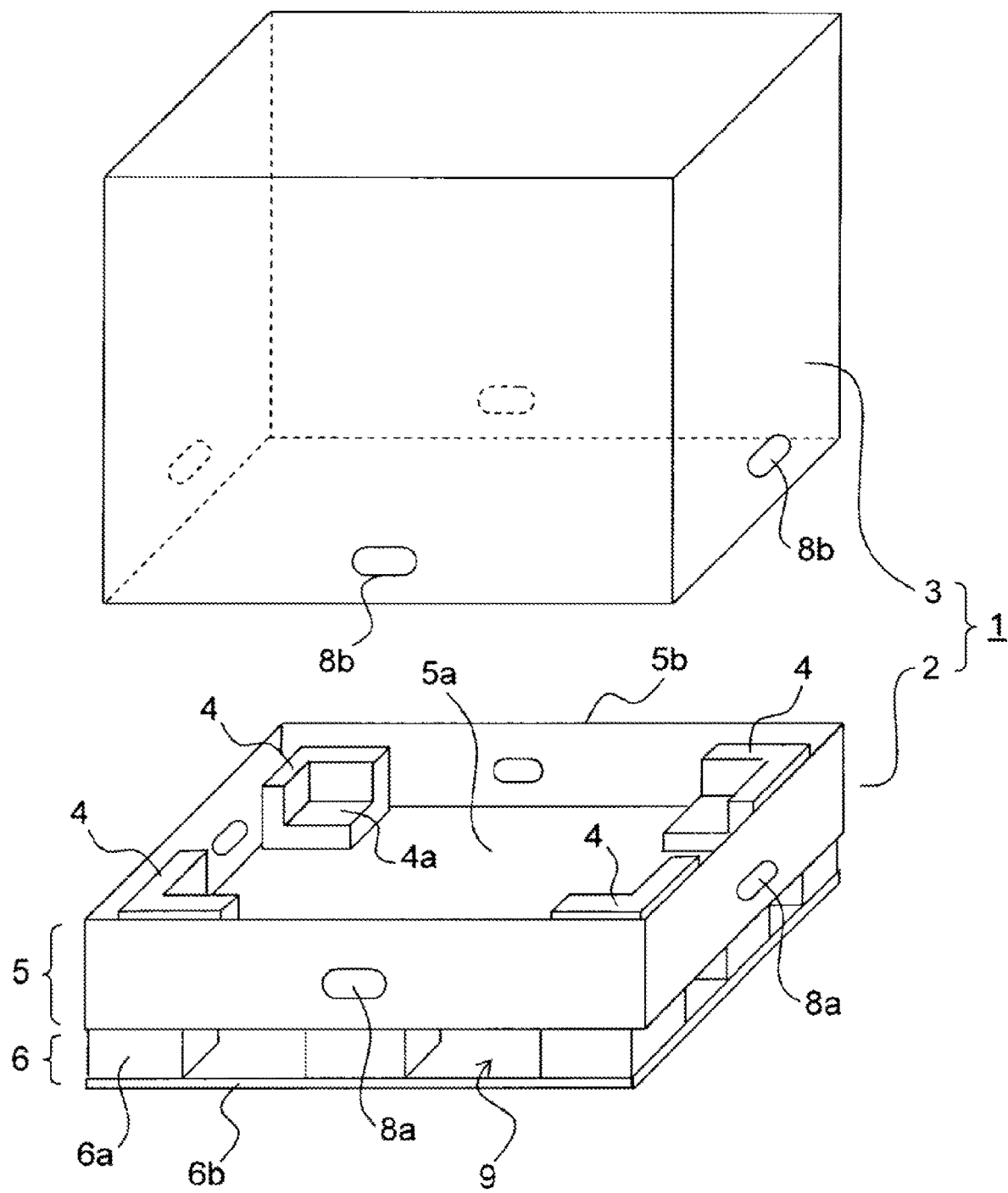
FIG. 1 is a disassembled perspective view showing an example of a structure of a packaging box 1 to which a packaging fastener 10 of the present disclosure is mounted.

Hereinafter, with reference the attached drawings, an embodiment according to the present invention will be described. FIG. 1 is a disassembled perspective view showing an example of a structure of a packaging box 1 to which a packaging fastener 10 of the present disclosure is mounted. The packaging box 1 includes a pallet 2 with tray, an upper box 3, and cushioning materials 4 disposed on the pallet 2 with tray.

The pallet 2 with tray includes a tray 5 and a pallet 6. The tray 5 has a bottom wall 5a on which a product (not shown), which is a packaged object, is placed and side walls 5b stood along the peripheral edge of the bottom wall 5a. The pallet 6 is fixed on the lower face of the tray 5. The cushioning materials 4 are disposed at four corners of the bottom wall 5a via predetermined intervals from the side walls 5b. Each side wall 5b of the tray 5 has an elliptical through hole 8a in the center portion.

The upper box 3 has a rectangular cylindrical shape whose side and upper faces cover the product and whose lower face is opened. In the lower portion of each side face of the upper box 3, a through hole 8b is formed in a position corresponding to the through hole 8a of the pallet 2 with tray. By inserting a packaging fastener 10 (refer to FIG. 2) into the overlapped through holes 8a and 8b, the pallet 2 with tray and the upper box 2 are coupled together.

The cushioning material 4 is made of corrugated cardboard or expanded polystyrene, and protects the packaged object against impact from an outside. The cushioning material 4 has a product placement face 4a corresponding to a shape of the product. Into the lower face of the cushioning material 4, a cut and raised piece (not shown) formed on the bottom wall 5a is inserted, so that the cushioning material 4 is positioned at a predetermined position and prevented from being displaced in the horizontal direction. The cushioning material 4 may be fixed to the bottom wall 5a in another way such as adhesion.

The pallet 6 includes a plurality of columns 6a, a top board (not shown) and a bottom board 6b. The column 6a is formed by folding a corrugate cardboard sheet, for example. The top board and the bottom board 6b are fixed on the upper and lower faces of the columns 6a, respectively. Between the columns 6a, arm insertion holes 9 through which an arm of a forklift or a hand pallet truck (a pallet transport cart) are formed.

Next, a process to package a product by using the packaging box 1 shown in FIG. 1 will be described. Firstly, a user places the product on the product placement faces 4a of the cushioning materials 4 disposed on the bottom wall 5a of the pallet 2 with tray. Next, the user disposes the cushioning materials on the upper face and the side face of the product as necessary, and then covers the product with the upper box 3. After that, the user stands the side walls 5b of the pallet 2 with tray upward. Finally, the user inserts the packaging fastener 10 into the overlapped through holes 8a of the side wall 5b and the through hole 8b of the upper box 3 to couple the pallet 2 with tray and the upper box 3 together.

Figure 2:
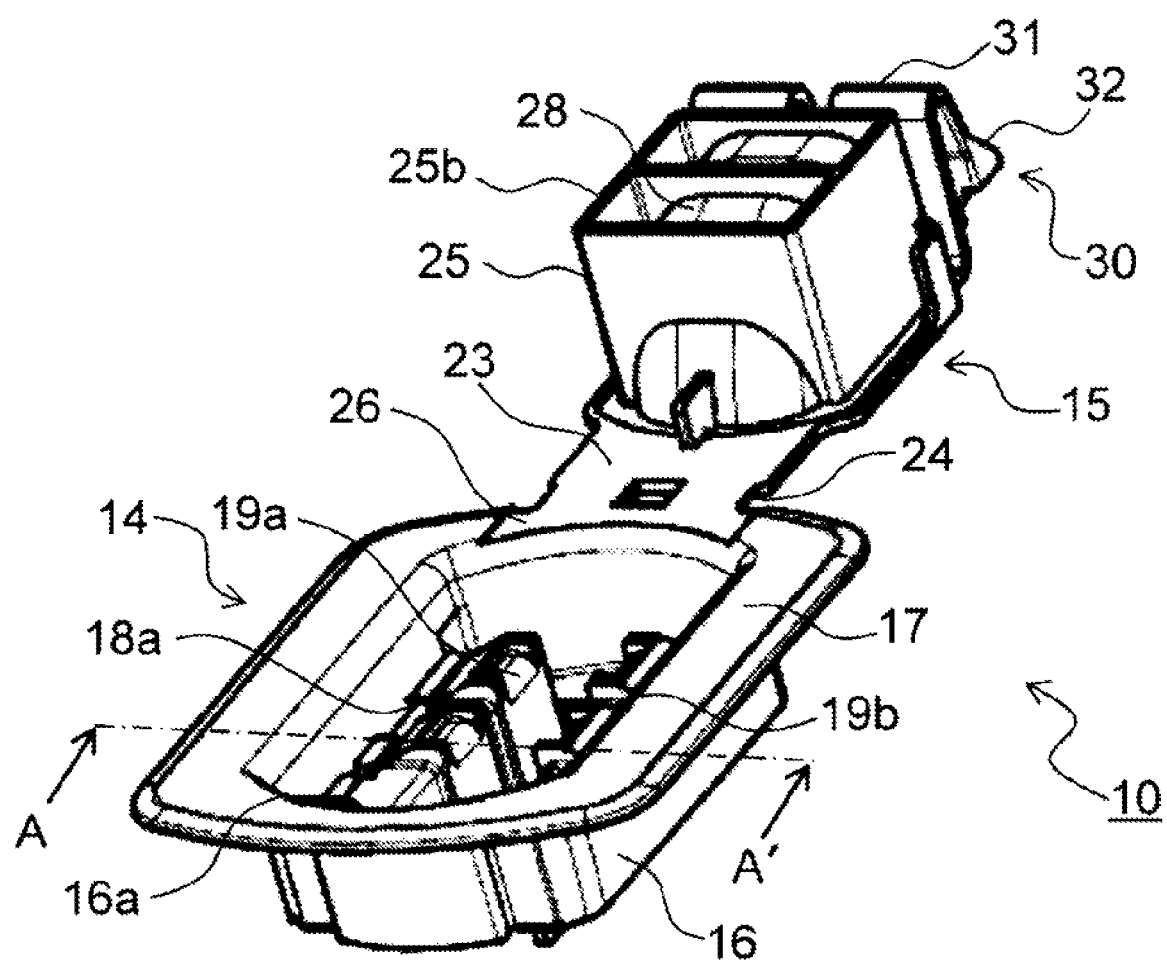
FIG. 2 is a perspective view showing the packaging fastener 10 according to one embodiment of the present disclosure, before using, when viewed from a side of a flange part 17.
Figure 3:
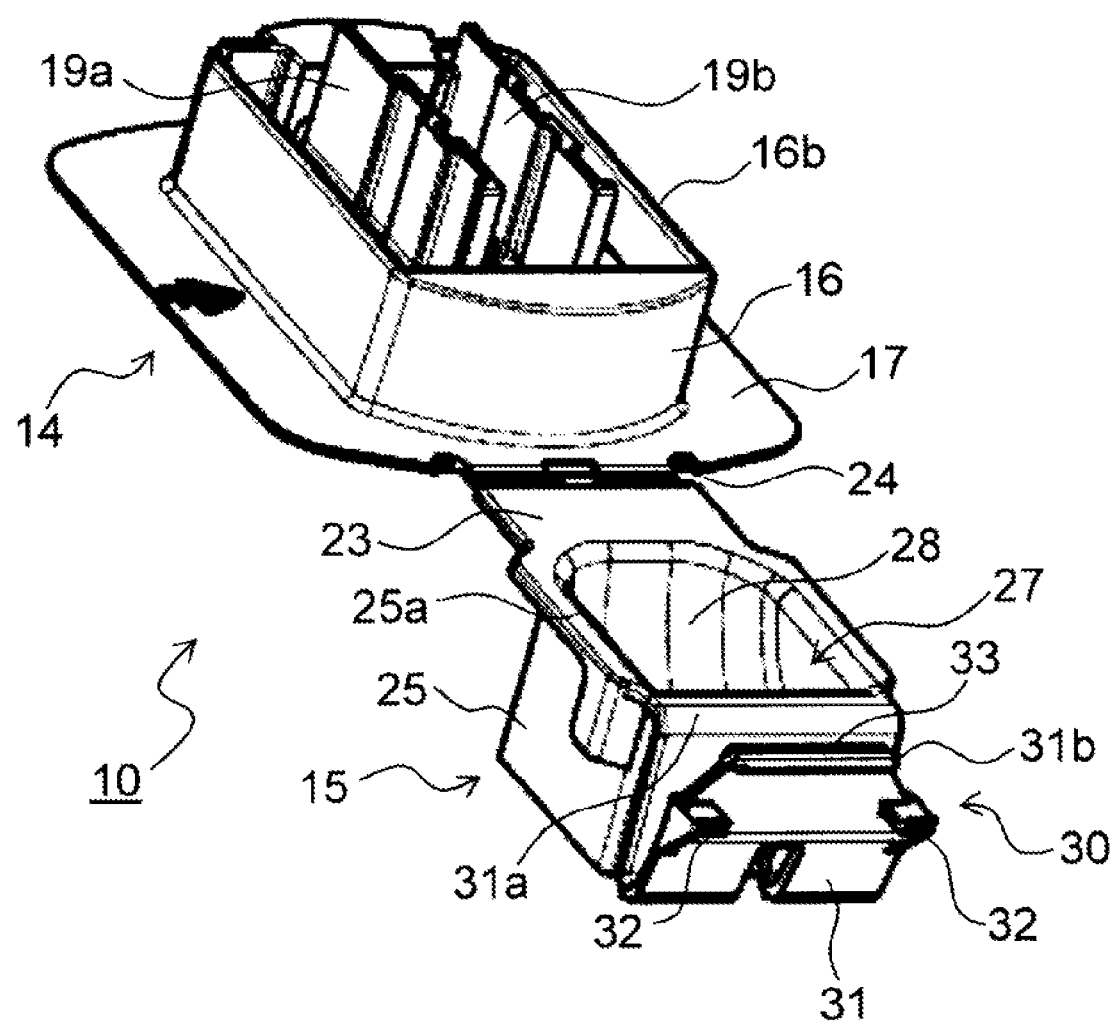
FIG. 3 is a perspective view showing the packaging fastener 10 according to the embodiment, before using, when viewed from a side of a first cylindrical part 16.
Figure 4:
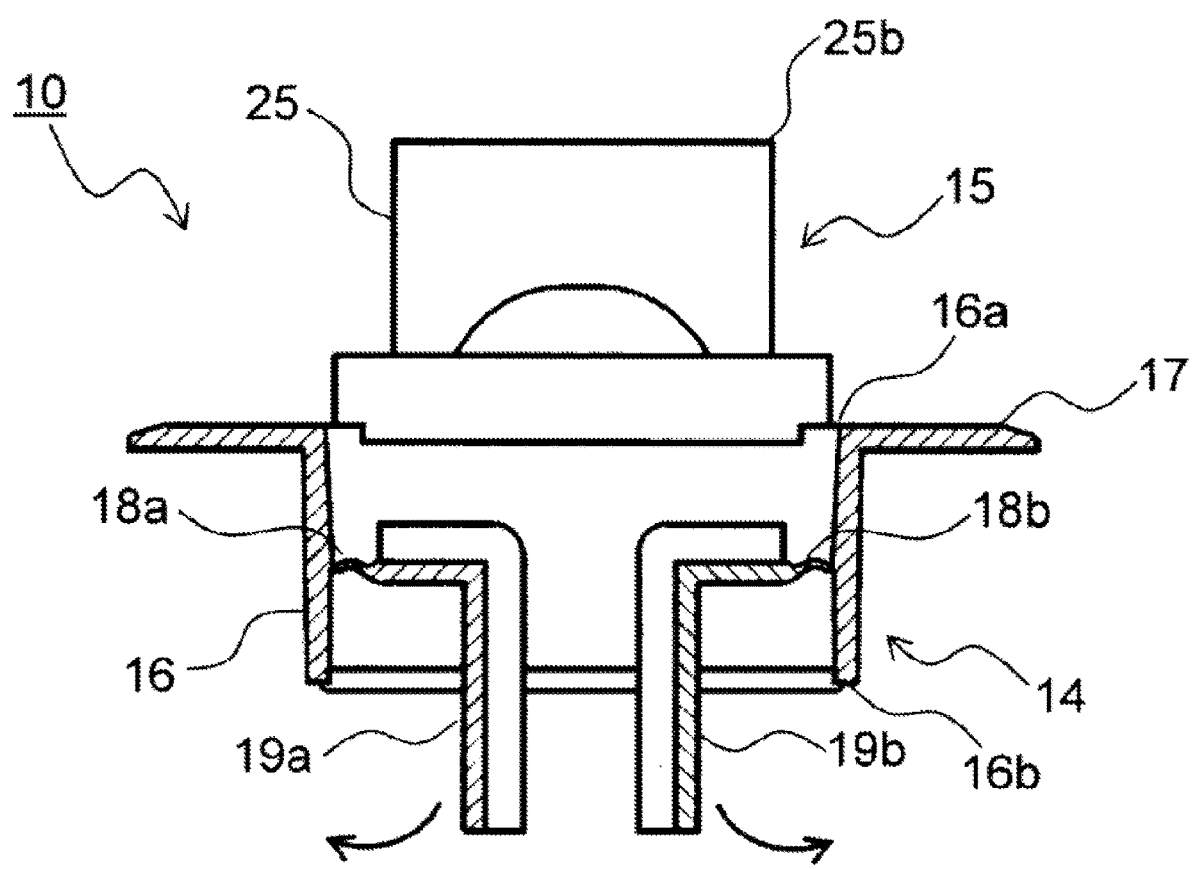
FIG. 4 is a sectional side view showing a base member 14 of the packaging fastener 10 according to the embodiment, when viewed from a direction perpendicular to first hinge portions 18a and 18b.

FIG. 2 and FIG. 3 are perspective views showing the packaging fastener 10 according to one embodiment of the present disclosure, before using, when viewed from a side of a flange part 17 (an outside of the packaging box 1) and when viewed from a side of a first cylindrical part 16 (an inside of the packaging box 1), respectively. FIG. 4 is a sectional side view showing a base member 14 of the packaging fastener 10 according to the embodiment, when viewed from a direction perpendicular to first hinge portions 18a and 18b (a sectional view taken along the line A-A' in FIG. 2).

As shown in FIG. 2 and FIG. 3, the packaging fastener 10 includes the base member 14 and a key member 15 connected to the base member 14 by a connection piece 23. The base member 14 has a first cylindrical part 16, the flange part 17 formed around a first opening edge 16a on one side of the first cylindrical part 16, and a pair of hook members 19a and 19b connected to opposite inner faces of the first cylindrical part 16 via the first hinge portions 18a and 18b in a turnable manner. The flange part 17 has a recess 26 into which the connection piece 23 of the key member 15 is stored when the key member 15 is inserted into the base member 14.

As shown in FIG. 4, the hook members 19a and 19b are bent outside a second opening edge 16b on the other side of the first cylindrical part 16 in an L-shape in a sectional view around the first hinge portions 18a and 18b respectively, and their tip end portions protrude from the first cylindrical part 16.

The key member 15 has a second cylindrical part 25 having almost the same outer size as the inner size of the first cylindrical part 16. By bending the connection piece 23 along a second hinge portion 24, the second cylindrical part 25 may be inserted into the first cylindrical part 16 of the base member 14. On the upper face of the key member 15, a first insertion part 27 is recessed, and on the bottom face of the first insertion part 27, an inclined plate 28 having an arc shape in a sectional view is formed.

On an end edge opposite to the second hinge portion 24 of the key member 15, an engaging part 30 is formed. The engaging part 30 has a supporting part 31, a lock claw 32 and a finger hooking part 33. The supporting part 31 is formed into an U-shape in a side view such that it extends from a third opening edge 25a (the upper end edge in FIG. 3) on one side (an upstream side in an insertion direction) of the second cylindrical part 25 as a base end portion 31a toward a fourth opening edge 25b on the other side of the second cylindrical part 25 in the insertion direction (the lower direction in FIG. 3) and then a tip end portion 31b is curved on a side of the base end portion 31a (the upper direction in FIG. 3).

The lock claws 32 are formed near the tip end portion 31b of the supporting part 31 in both end portions in an axial direction (a left-and-right direction in FIG. 3) of the second hinge portion 24 perpendicular to the extension direction of the supporting part 31. When the second cylindrical part 25 is inserted in the first cylindrical part 16, the lock claws 32 are engaged with engaged parts 40 (refer to FIG. 5) formed on the inner wall face of the first cylindrical part 16 of the base member 14. Then, the key member 15 is locked with the second cylindrical part 25 inserted into the first cylindrical part 16 of the base member 14.

The finger hooking part 33 is formed in the tip end portion 31b of the supporting part 31 between the lock claws 32. When the engagement of the engaging part 30 with the engaged part 40 is released, the user hooks his finger on the finger hooking part 33 and then deforms the supporting part 31 elastically, as described later.

An action to couple the packaging box 1 using the packaging fastener 1 having the above described configuration will be described. Firstly, in a state where the through hole 8a of the side wall 5b of the pallet 2 with tray is overlapped with the through hole 8b of the upper box 3 (both are shown in FIG. 1), the user inserts the first cylindrical part 16 of the base member 14 of the packaging fastener 10 into the through holes 8a and 8b from an outside of the side wall 5b with the second opening edge 16b first.

Next, from the state shown in FIG. 2, the user turns the key member 15 around the second hinge portion 24 and folds it to a side of the base member 14. Then, the second cylindrical part 25 comes into contact with the hook members 19a and 19b. After that, the user inserts the second cylindrical part 25 into the first cylindrical part 16 through the first opening edge 16a. Then, the hook members 19a and 19b are pushed by the second cylindrical part 25 and turned outside the first cylindrical part 16 (a direction shown by the arrow in FIG. 4) around the first hinge portions 18a and 18b, respectively.

Figure 5:
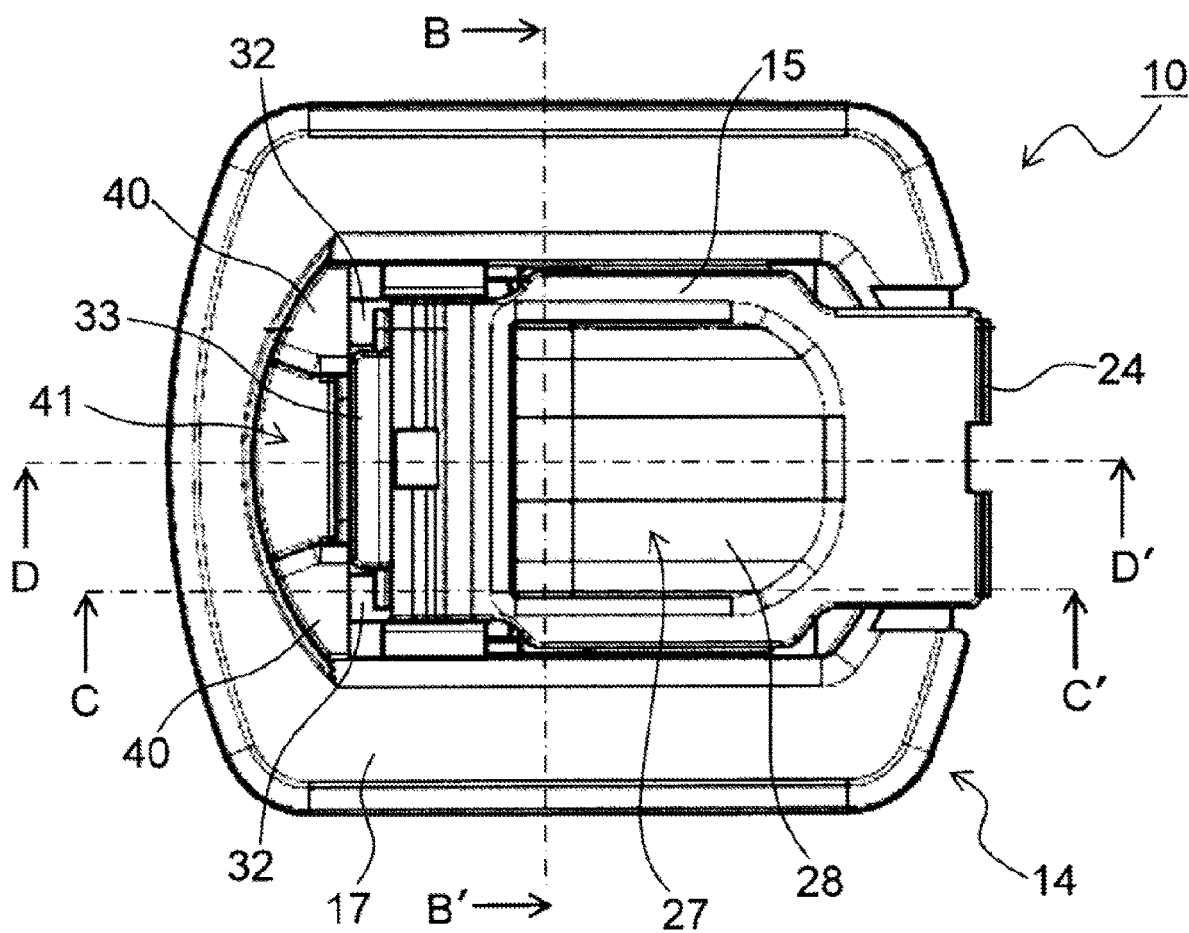
FIG. 5 is a plan view showing the packaging fastener 10 according to the embodiment, in which a key member 15 is completely inserted into the inside of the first cylindrical part 16, when viewed from a side of the flange part 17.
Figure 6:
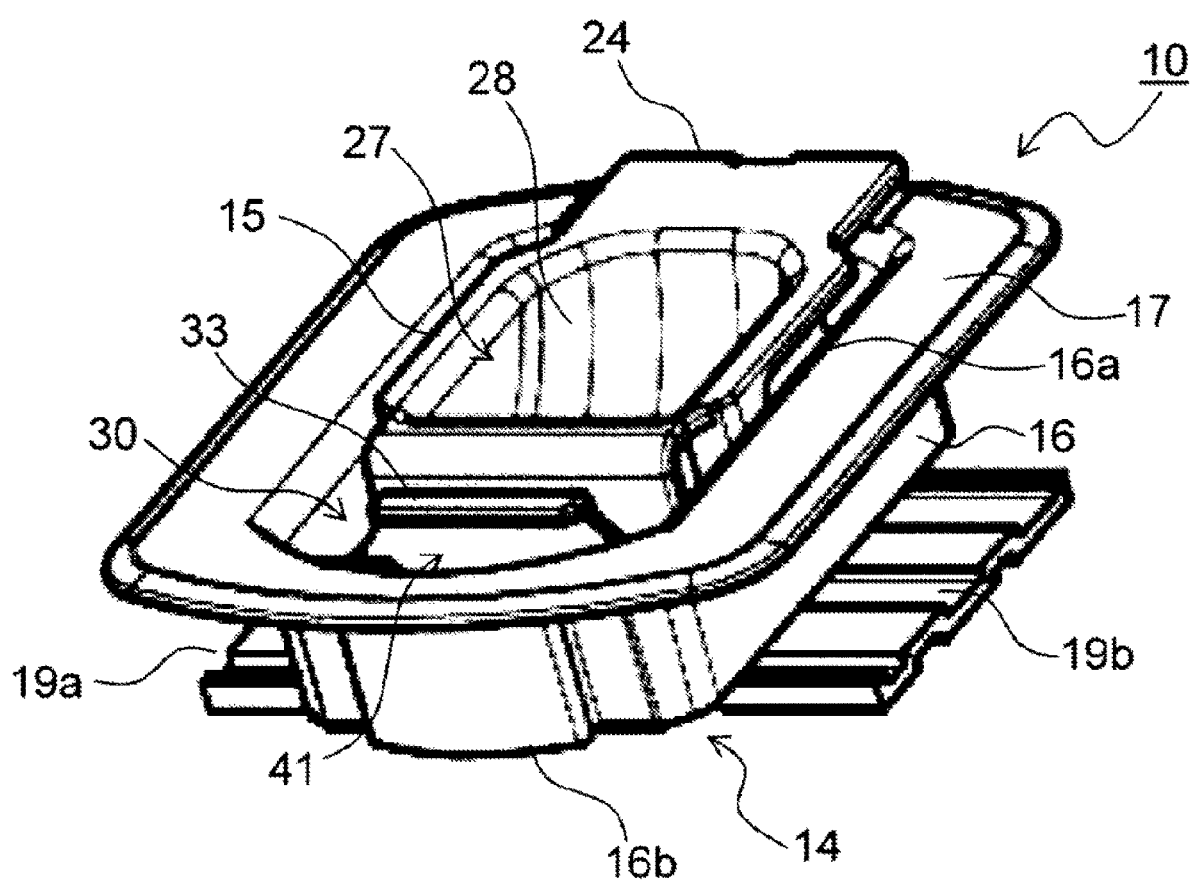
FIG. 6 is a perspective view showing the packaging fastener 10 according to the embodiment, in which the key member 15 is completely inserted into the inside of the first cylindrical part 16, when viewed from a side of the flange part 17.
Figure 7:
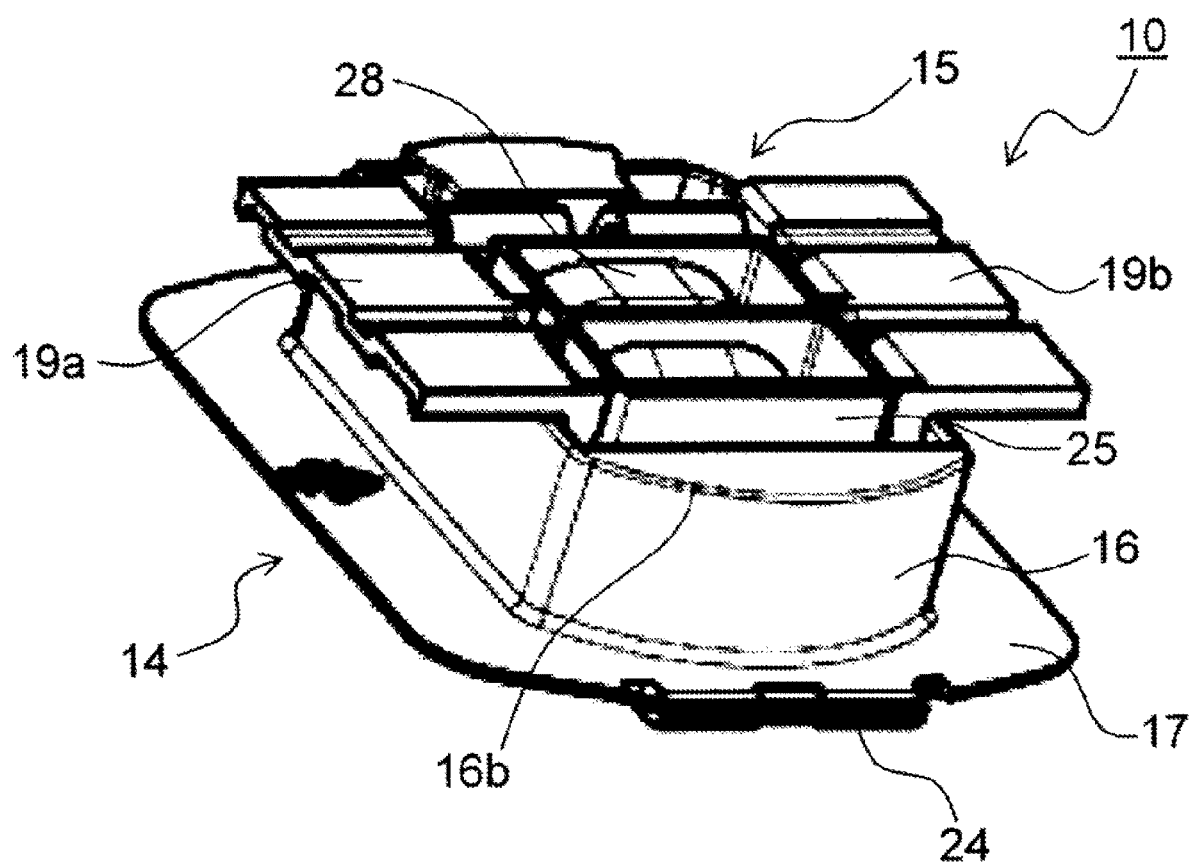
FIG. 7 is a perspective view showing the packaging fastener 10 according to the embodiment, in which the key member 15 is completely inserted into the inside of the first cylindrical part 16, when viewed from a side of hook members 19a and 19b.
Figure 8:
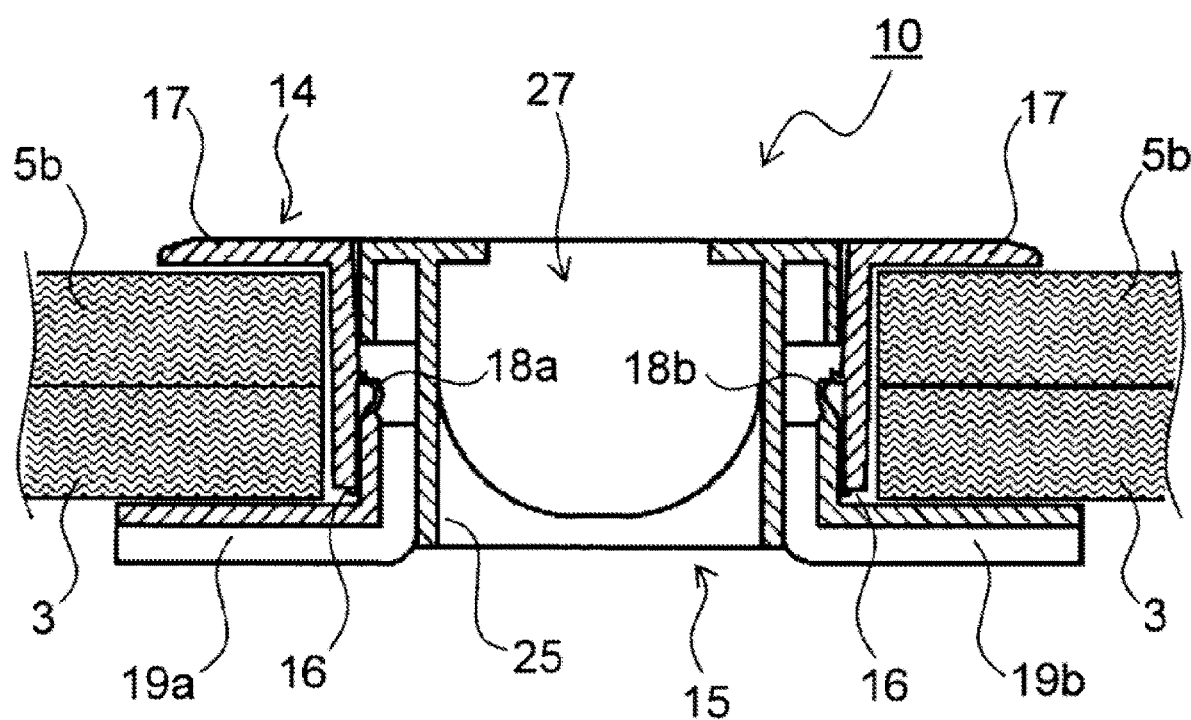
FIG. 8 is a sectional side view showing the packaging fastener 10 according to the embodiment, in which the key member 15 is inserted into the base member 14 to hold a side wall 5b of a pellet 2 with tray and an upper box 3, when viewed from a direction perpendicular to the first hinge portions 18a and 18b.

FIG. 5 is a plan view showing the packaging fastener 10 according to the embodiment, in which the key member 15 is inserted into the base member 14, when viewed from a side of the flange part 17. FIG. 6 and FIG. 7 are perspective views showing the packaging fastener 10 according to the embodiment, in which the key member 15 is inserted into the base member 14, when viewed from a side of the flange part 17 and when viewed from a side of hook members 19a and 19b, respectively. FIG. 8 is a sectional side view showing the packaging fastener 10 according to the embodiment, in which the key member 15 is inserted into the base member 14 to hold the side wall 5b of the pellet 2 with tray and the upper box 3, when viewed from a direction perpendicular to the first hinge portions 18a and 18b (a sectional view taken along the line B-B' in FIG. 5).

In a state where the key member 15 (the second cylindrical part 25) is completely inserted into the base member 14 (the first cylindrical part 16), the tip end portions of the hook members 19a and 19b pushed by the second cylindrical part 25 are protruded from the first cylindrical part 16 almost in parallel with the flange part 17. At this time, as shown in FIG. 8, the side wall 5b of the pallet 2 with tray and the upper box 3 are held between the flange part 17 and the hook members 19a and 19b.

In a state where the side wall 5b of the pallet 2 with tray and the upper box 3 are coupled together as shown in FIG. 8, in a case where an external force to turn the hook members 19a and 19b inward is applied, or even in a case where the external force is not applied, because a force to turn the hook members 19a and 19b inward owing to a restoring force of the first hinge portions 18a and 18b is applied, the second cylindrical part 25 may be pushed back by the hook members 19a and 19b. Then, the engagement of the key member 15 with the base member 14 may be released.

Then, in the present embodiment, the engagement of the key member 15 with the base member 14 is kept using the engaging part 30 formed in the key member 15 and the engaged part 40 formed in the base member 14. As the key member 15 is turned around the second hinge portion 24 and the second cylindrical part 25 is inserted into the first cylindrical part 16, the inclined faces 32a (refer to FIG. 9) of the lock claws 32 run on the engaged parts 40. Then, the supporting part 31 is elastically deformed in a direction separate away from the engaged parts 40.

Figure 9:
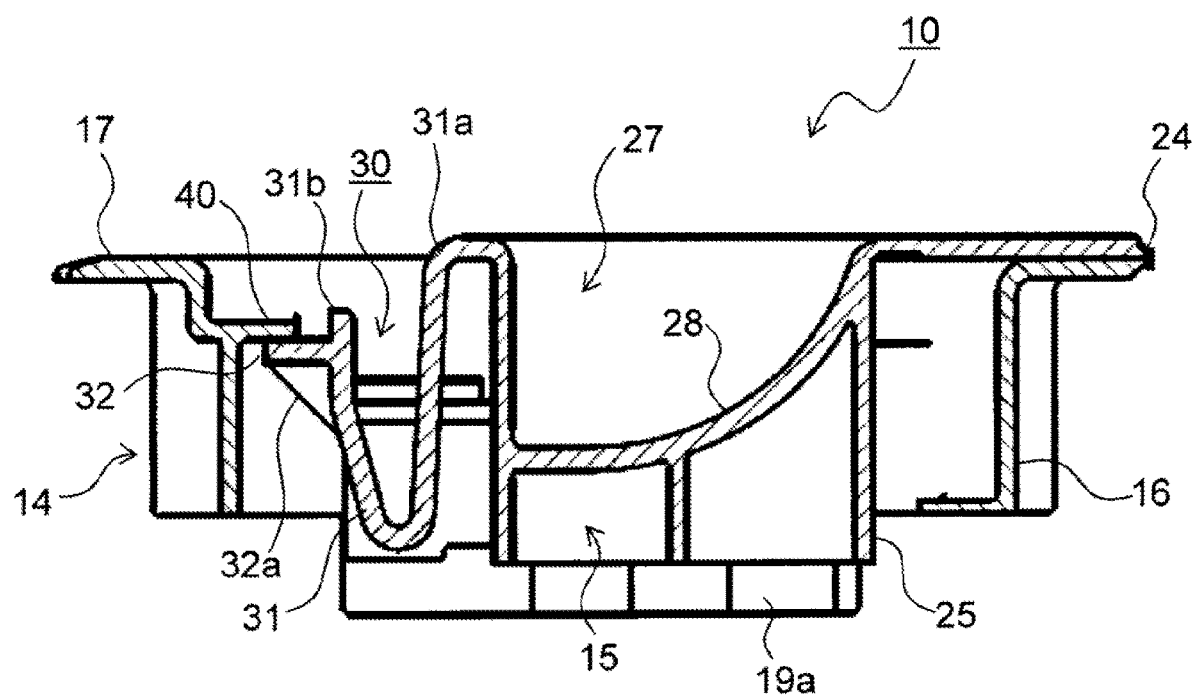
FIG. 9 is a longitudinal sectional side view showing a lock claw 32 of the packaging fastener 10 according to the embodiment, in which the key member 15 is inserted into the base member 14, and the peripheral of the lock claw 32.

FIG. 9 is a longitudinal sectional side view showing the lock claw 32 of the packaging fastener 10 according to the embodiment, in which the key member 15 is inserted into the base member 14, and the peripheral of the lock claw 32 (a sectional view taken along the line C-C' in FIG. 5). When the hook members 19a and 19b are completely turned by the second cylindrical part 25, as shown in FIG. 9, the inclined faces 32a of the lock claws 32 get over the engaged parts 40, and the elastically deformed supporting part 31 is deformed in a direction closer to the engaged part 40 (the left direction in FIG. 9) by a restoring force. Then, the lock claws 32 are engaged with the lower portions of the engaged parts 40, so that it becomes possible to keep the engagement of the key member 15 with the base member 14 firmly.

Figure 10:
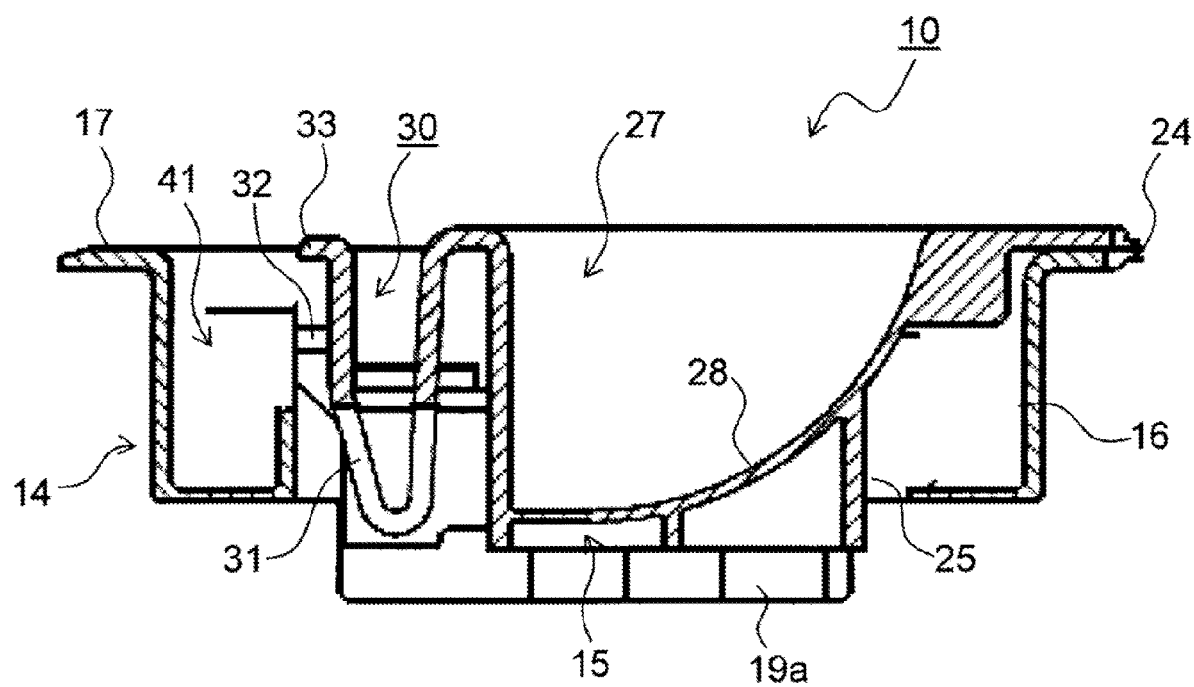
FIG. 10 is a longitudinal sectional side view showing a finger hooking part 33 of the packaging fastener 10 according to the embodiment, in which the key member 15 is inserted into the base member 14, and the peripheral of the finger hooking part 33.

FIG. 10 is a longitudinal sectional side view showing the finger hooking part 33 of the packaging fastener 10 according to the embodiment, in which the key member 15 is inserted into the base member 14, and the peripheral of the finger hooking part 33 (a sectional view taken along the line D-D' in FIG. 5). As shown in FIG. 5, the finger hooking part 33 is formed between the lock claws 32 in a plan view, and the engaged parts 40 are formed only portions corresponding to the lock claws 32 (both end portions in the width direction).

Then, between the key member 15 and the first cylindrical part 16, a second insertion part 41 is formed near the center portion in the width direction (a direction perpendicular to a paper surface on which FIG. 10 is drawn, an upper-and-lower direction in FIG. 5) of the supporting part 31 in which the finger hooking part 33 is formed. That is, on one side (the right side in FIG. 10) of the engaging part 30, the first insertion part 27 is formed while on the other side (the left side in FIG. 10) of the engaging part 30, the second insertion part 41 is formed.

Figure 11:
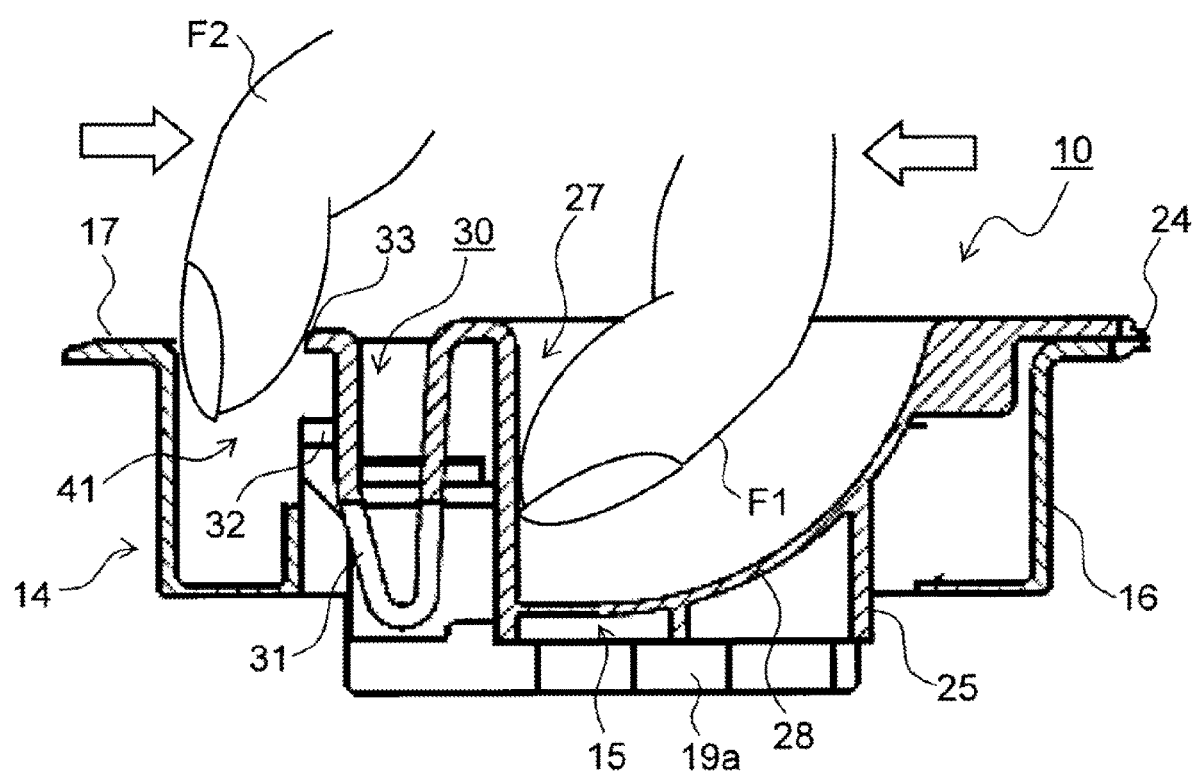
FIG. 11 is a view showing a state in which a finger is inserted into a first insertion part 27 and a second insertion part 41 to release an engagement of an engaging part 30 with an engaged part 40, from the state shown in FIG. 9.

When the packaging box 1 is unpacked, as shown in FIG. 11, the user inserts his first ginger F1 (a thumb, for example) into the first insertion part 27 of the key member 15 along the inclined plate 28. The first finger F1 is guided to a back face side of the supporting part 31 (a side of the base end portion 31a). Next, the user inserts his second finger (a forefinger, for example) into the second insertion part 41 between the engaging part 30 and the first cylindrical part 16. Then, the user performs an action to hook the finger hooking part 33 with his second finger F2 and then to hold the supporting part 31 with his first finger F1 and his second finger F2.

As a result, the supporting part 31 is elastically deformed, the lock claw 32 is displaced in a direction separate away from the engaged part 40 (the right direction in FIG. 11), and the engagement of the lock claws 32 with the engaged parts 40 is released such that the key member 15 is enable to be tuned in a direction of the flange part 17.

Then, from the state shown in FIG. 11, the user holds the second cylindrical part 25 and then pulls out it from the first cylindrical part 16. As the pulling out of the second cylindrical part 25, the hook members 19a and 19b, which are pushed by the second cylindrical part 25 and turned outward, are turned inward by the restoring force of the first hinge portions 18a and 18b, and returned into the state shown in FIG. 4. Finally, the user pulls out the base member 14 from the through holes 8a and 8b, and then the coupling of the side wall 5b of the pallet 2 with tray to the upper box 3 is released.

According to the packaging fastener 10 of the present embodiment, the engaging part 30 of the key member 15 is engaged with the engaged part 40 of the base member 14 in the state where the side wall 5b of the pallet 2 with tray and the upper box 3 are coupled together, so that the state where the key member 15 is inserted into the base member 14 can be kept firmly. Accordingly, it becomes possible to efficiently prevent the packaging fastener 10 from being removed owing to vibration and impact during transportation.

Furthermore, when the packaging box 1 is unpacked, when the user performs only the action to insert his fingers into the first insertion part 27 and the second insertion part 41 and then to hold the supporting part 31 with his fingers, the finger hooking part 33 is pushed by the finger to deform the supporting part 31 elastically, and the engagement of the lock claws 32 with the engaged parts 40 is released. Accordingly, the user can easily understand the way for removing the packaging fastener 10 without an explanatory drawing regarding the removing way of the packaging fastener 10, and the operability in releasing the fitting of the base member 14 and the key member 15 is also improved.

Furthermore, in a conventional packaging fastener 10 including a base member 14 and a key member 15, a first insertion part 27 formed in a second cylindrical part 25 of the key member 15 penetrates from a third opening edge 25a to a fourth opening edge 25b of the second cylindrical part 25 owing to restriction of a dye. Then, there is a problem that foreign matter, such as dust and insect, may enter the inside of the packaging box 1 through the first insertion part 27.

The present embodiment has a configuration that the engaging part 30 having the lock claws 32 and the finger hooking part 33 is formed in the supporting part 31 having a U-shape in a side view. This eliminates the restriction of the dye, and it becomes possible to completely close the fourth opening edge 25b of the first insertion part 27 with the inclined plate 28, as shown in FIG. 9 to FIG. 12. Accordingly, it becomes possible to prevent the dust and insect from entering the inside of the packaging box 1.

Figure 12:
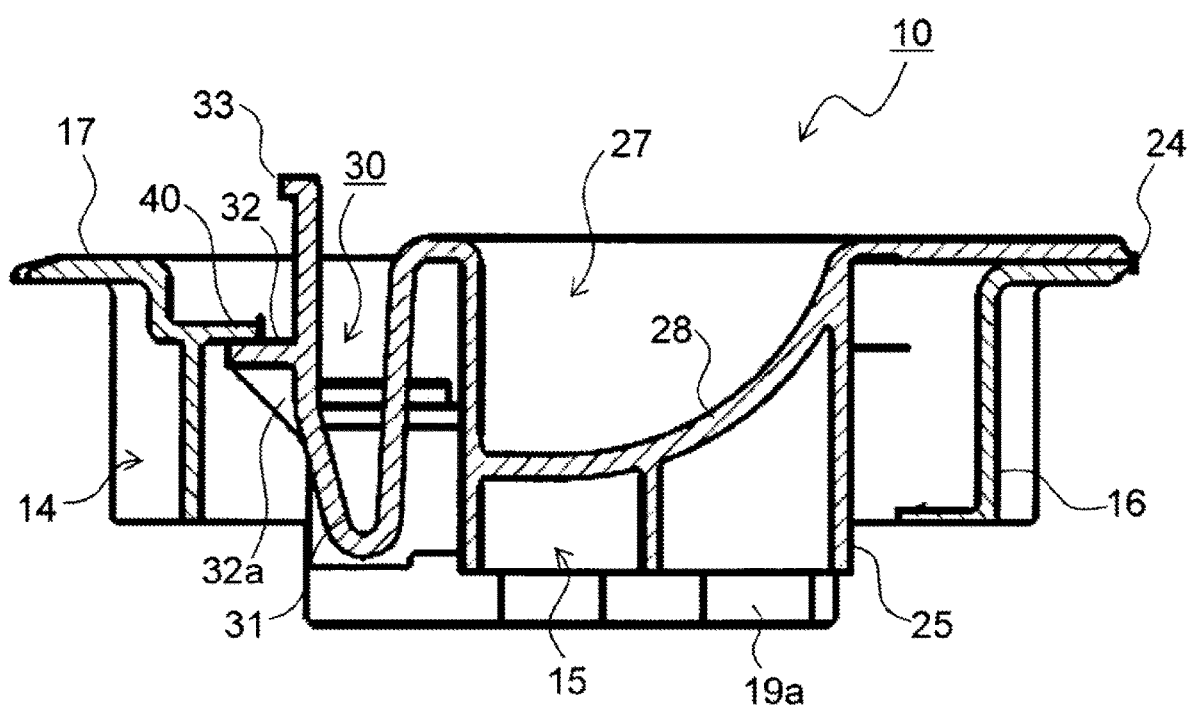
FIG. 12 is a longitudinal sectional side view showing the finger hooking part 33 of a modified example of the packaging fastener 10 according to the embodiment and the peripheral of the finger hooking part 33.

Furthermore, the present disclosure is not limited to the above embodiment, and various modification may be made without departing from the scope of the present disclosure. For example, in the above embodiment, the second insertion part 41 is formed between the engaging part 30 and the first cylindrical part 16, however, as shown in FIG. 12, the tip end portion of the supporting part 31 is configured to extend above the first opening edge 16a of the first cylindrical part 16 (the end edge on a side of the flange part 17), so that it becomes possible for the user to perform the action to hook the finger hooking part 33 with fingers and to hold it with the fingers easily without providing the second insertion part 41.

In a case where the tip end portion of the supporting part 31 (the finger hooking part 33) protrudes above the first opening edge 16a of the first cylindrical part 16, the tip end portion of the supporting part 31 may be caught during the transportation and storage of the packaging box 1. Then, the configuration that the tip end portion of the supporting part 31 is on the same level as or lower than the first opening edge 16a of the first cylindrical part 16, as shown in FIG. 10, is preferable.

The above embodiment describes the packaging fastener 10 for the packaging box 1 using the pallet 2 with tray having the tray 5 and the pallet 6, but it is clear that the packaging fastener 10 of the present disclosure is applied for the packaging box 1 including only the upper box 3 and the tray 5 in the same manner.

The present disclosure is applicable for a packaging faster which is inserted into overlapped holes of packaging materials, such as a corrugated cardboard sheet, to couple the two or more divided packaging materials together. The using of the present disclosure can provide a packaging fastener in which an engagement of the key member with the base member is hardly released owing to impact during transportation while the engagement is easily released in opening of the packaging box.

The invention claimed is:

1. A packaging fastener comprising a base member and a key member, wherein
the base member includes:
a first cylindrical part inserted through overlapped through holes of packaging materials;
a flange part formed around a first opening edge opened on one end side of the first cylindrical part; and
a pair of hook members connected to an inner wall face of the first cylindrical part so as to face each other and bent outside a second opening edge opened on the other end side of the first cylindrical part, and
the key member includes a second cylindrical part inserted into the first cylindrical part of the base member, wherein
the packaging fastener couples the packaging materials, by inserting the first cylindrical part of the base member into the through holes from a side of the second opening edge and then inserting the second cylindrical part into the first cylindrical part, so that the hook members are bent to be protruded outside through the second opening edge to nip the packaging materials with the flange part, wherein
the key member has an engaging part formed on a third opening edge opened on one end side of the second cylindrical part to lock the key member to the base member in a state where the second cylindrical part is inserted into the first cylindrical part, and
the base member has an engaged part formed on the inner wall of the first cylindrical part, wherein
the engaging part has:
a supporting part that is elastically deformable and has a U-shape in a side view, connected to the third opening edge and extending toward a fourth opening edge opened on the other end side of the second cylindrical part; and
a lock claw formed near a tip end portion of the supporting part and engaged with the engaged part, wherein
in a state where the lock claw is engaged with the engaged part, by elastically deforming the supporting part, the lock claw is displaced to a direction separate away from the engaged part to release an engagement of the lock claw with the engaged part.

2. The packaging fastener according to claim 1, wherein
the hook member includes a pair of hook members, the pair of hook members are connected to the inner wall face of the first cylindrical part with first hinge portions so as to face each other, and
the key member is connected to the flange part with a second hinge portion perpendicular to the first hinge portions.

3. The packaging fastener according to claim 2, wherein
the lock claw includes a pair of lock claws formed in end portions in an axial direction of the second hinge portion of the supporting part, and the engaged part includes a pair of engaged parts formed in portions facing the pair of lock claws.

4. The packaging fastener according to claim 3, wherein
in the state where the second cylindrical part is inserted into the first cylindrical part, the tip end portion of the supporting part is on the same level as the first opening edge of the first cylindrical part or inside the first cylindrical part with respect to the first opening edge.

5. The packaging fastener according to claim 1, wherein
in the state where the second cylindrical part is inserted into the first cylindrical part, the tip end portion of the supporting part is disposed closer to the first opening edge of the first cylindrical part than the lock claw.

6. The packaging fastener according to claim 1, wherein
the tip end portion of the supporting part has a finger hooking part which is pressed while the supporting part is elastically deformed,
the key member has a first insertion part recessed from the third opening edge toward the fourth opening edge,
a second insertion part is formed between the tip end portion of the supporting part and the inner wall face of the first cylindrical part in the state where the second cylindrical part is inserted into the first cylindrical part, and when the second cylindrical part is pulled out the first cylindrical part, one finger is inserted into the first insertion part to hook the finger hooking part with the one finger while the other finger is inserted into the second insertion part, the finger hooking part is pushed with the one finger to elastically deform the supporting part, and then an engagement of the lock claw with the engaged part is released.

7. The packaging fastener according to claim 5, wherein
the lock claw includes a pair of lock claws formed in end portions in an axial direction of the second hinge portion of the supporting part, and
the finger hooking part is formed in a center portion in the axial direction of the second hinge portion of the supporting part between the pair of lock claws.

8. The packaging fastener according to claim 1, wherein
the lock claw has an inclined plate which comes into contact with the engaged part while the second cylindrical part is inserted into the first cylindrical part and then elastically deforms the supporting part.

9. The packaging fastener according to claim 5, wherein
the key member has an inclined plate which guides the other finger inserted through the first insertion part to a side of a base end side of the supporting part.

10. The packaging fastener according to claim 8, wherein
the inclined plate closes the first insertion part on a side of the fourth opening edge of the second cylindrical part.

11. A packaging box comprising:
a packaging material including a pallet with tray on which a packaged object is placed, and a rectangular cylindrical upper box covering side faces and an upper face of the packaged object; and
the packaging fastener according to claim 1, which couples the pallet and the upper box together.

* * * * *